US012593013B2

(12) United States Patent
Jeong

(10) Patent No.: US 12,593,013 B2
(45) Date of Patent: Mar. 31, 2026

(54) DRIVING VIDEO RECORDING METHOD OF VEHICLE AND RECORDING DEVICE FOR THE SAME

(71) Applicants: Hyundai Motor Company, Seoul (KR); Kia Corporation, Seoul (KR)

(72) Inventor: Dong Hyuk Jeong, Hwaseong (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/819,221

(22) Filed: Aug. 29, 2024

(65) Prior Publication Data

US 2025/0097387 A1      Mar. 20, 2025

(30) Foreign Application Priority Data

Sep. 19, 2023    (KR) ......................... 10-2023-0124788

(51) Int. Cl.
H04N 7/18 (2006.01)
H04N 5/91 (2006.01)
G06V 20/40 (2022.01)

(52) U.S. Cl.
CPC ............... H04N 7/183 (2013.01); H04N 5/91 (2013.01); G06V 20/44 (2022.01)

(58) Field of Classification Search
None
See application file for complete search history.

(56) References Cited

U.S. PATENT DOCUMENTS

| | | | | |
|---|---|---|---|---|
| 2017/0359553 A1* | 12/2017 | Kim | ....................... | G06V 10/95 |
| 2019/0291642 A1* | 9/2019 | Chae | ....................... | G06T 7/30 |
| 2022/0360743 A1* | 11/2022 | Kim | ....................... | H04N 7/181 |

OTHER PUBLICATIONS

Kim, Abstract English Translated Korean Patent Application KR 101923022 (Year: 2018).*

* cited by examiner

*Primary Examiner* — Eileen M Adams
(74) *Attorney, Agent, or Firm* — Fox Rothschild LLP

(57) ABSTRACT

A driving video recording method and device for a vehicle are equipped with an audio video navigation (AVN) system that records a situation outside the vehicle as a video through at least one built-in camera in the vehicle, which may transmit a current location of the vehicle to an external server; acquires, by the external server, closed-circuit television (CCTV) information of at least one CCTV around the current location of the vehicle through a management server that manages public CCTVs; and synthesizes and stores, by the AVN system or the external server, a camera video recorded through the built-in camera and the CCTV information acquired through the management server, thereby integrating a video with a viewpoint from the inside/outside to the outside/inside of the vehicle to generate driving information of the vehicle without blind spots.

19 Claims, 6 Drawing Sheets

DRIVING VIDEO RECORDING METHOD OF VEHICLE AND RECORDING DEVICE FOR THE SAME

CROSS-REFERENCE TO RELATED APPLICATION

This application claims under 35 U.S.C. § 119(a) the benefit of Korean Patent Application No. 10-2023-0124788, filed on Sep. 19, 2023, the entire contents of which are incorporated by reference herein.

BACKGROUND

(a) Technical Field

The present disclosure relates to a driving video recording method for a vehicle and a recording device for the driving video recording method.

(b) Description of the Related Art

In general, a vehicle video recording device, also referred to as a vehicle black box, which records the situations occurring inside and outside a vehicle as images while the vehicle is driving or parked/stopped, may be a convenience device that records images before and after a collision accident (event) and provides information necessary to determine the circumstances of the accident.

The video recording device, which was initially provided only as an external device, has recently been provided as a built-in device embedded in a vehicle before the release of the vehicle.

This built-in video recording device may access driving data of a host vehicle and be linked with other controllers (e.g., a multi-function device having a function of checking the speed and seat belt wearing state of the vehicle, navigation and high-pass functions, or an emergency rescue signal function in case of crisis or emergency), and due to such advantages, its use is gradually increasing compared to an external video recording device.

In addition, while the external video recording device has a camera focusing only on the front side of a vehicle to acquire images, the built-in video recording device has multiple channels including channel 1 for forward looking, channel 2 for forward and backward looking, and channel 4 for forward/backward and left/right-side looking according to requirements (e.g., the number of cameras) from a user in consideration of autonomous driving.

However, since cameras basically look forward based on their installation positions, there may be blind spots depending on the number of cameras installed and their positions, examples of which are shown in FIGS. 1A to 1C.

FIG. 1A shows an example case where a single camera looks forward, and there are blind spots formed behind and on the left and right sides of a vehicle.

In addition, FIG. 1B shows an example case where two cameras look forward and backward, and there are blind spots formed on the left and right sides of a vehicle.

Lastly, FIG. 1C shows an example case where four cameras look front/back/left/right sides of a vehicle. Although this may be a method that may acquire the most surrounding information as images, the left and right cameras are generally installed around side mirrors, and thus there are blind spots formed on the left front or right front sides of the vehicle.

That is, to eliminate blind spots and acquire images without the blind spots in all directions of a vehicle, more cameras may need to be installed. However, this may cause issues and require considerations in the process of producing a vehicle, and simply in terms of a cost-increasing factor, such a built-in video recording device may increase the cost, laying a burden on consumers.

In addition, even if multiple cameras are provided in consideration of the issues described above, the observation of the cameras may be made only based on a vehicle, and thus there may be many cases in which accurate contextual or situational information cannot be identified depending on situations when there are accidents or other events. That is, areas obscured by other vehicles or geometrical features nearby may make it difficult to identify accurate situations only with images acquired from cameras installed in a vehicle.

Therefore, there has been a need to develop a technology that allows for no blind spots while maintaining the option of front and rear two-channel cameras, which are the most popular choice among consumers.

SUMMARY

An object of the present disclosure is to provide a vehicle video recording method and a recording device therefor, which may identify a location of a driving vehicle and use road closed-circuit television (CCTV) information and road information (e.g., accident and construction information, etc.) provided by the government (the Ministry of Land, Infrastructure, and Transport (MOLIT) of Korea) and other private institutions, when using only images recorded in a built-in camera provided in the vehicle is not sufficient to identify the circumstances of an accident, and may thereby supplement blind spots that are not captured in the images acquired by the built-in camera.

To solve the preceding technical problems, according to an embodiment of the present disclosure, there is provided a video recording method of a vehicle equipped with an audio video navigation (AVN) system and at least one camera configured to record, as a video, a situation outside the vehicle, the video recording method comprising transmitting a current location of the vehicle to an external server, acquiring, by the external server, closed-circuit television (CCTV) information of at least one CCTV around the current location of the vehicle through a management server configured to manage public CCTVs, and synthesizing and storing, by the AVN system or the external server, a camera video recorded through the camera and the CCTV information, wherein the CCTV information comprises a CCTV-recorded video of a viewpoint from which the vehicle is viewed from the outside.

To solve the preceding technical problems, according to an embodiment of the present disclosure, the CCTV information may further include a location, a unique code, an operating state, and a viewing direction of the CCTV.

To solve the preceding technical problems, according to an embodiment of the present disclosure, the transmitting of the current location of the vehicle may include transmitting, by the AVN system, a global positioning system (GPS) information that is based on the current location of the vehicle, and a driving path of the vehicle.

To solve the preceding technical problems, according to an embodiment of the present disclosure, the acquiring of the CCTV information may include acquiring the CCTV information from the at least one CCTV viewing the vehicle based on the current location and the driving path of the vehicle.

To solve the preceding technical problems, according to an embodiment of the present disclosure, the synthesizing and storing may include synchronizing the camera video and the CCTV-recorded video, and integrating the camera video and the CCTV-recorded video synchronized by the synchronizing into a multi-channel video and storing the multi-channel video.

To solve the preceding technical problems, according to an embodiment of the present disclosure, the synthesizing may further include: based on acquisition time information of metadata included in each of the camera video and the CCTV-recorded video, buffering, by the external server, the camera video for a predetermined period of time to match a time interval at which the CCTV-recorded video is received from the management server.

To solve the preceding technical problems, according to an embodiment of the present disclosure, the synthesizing and storing may include acquiring, by the external server, the camera video from the AVN system; and editing and storing the CCTV information by overlapping the CCTV information with the camera video.

To solve the preceding technical problems, according to an embodiment of the present disclosure, the video recording method may further include determining whether an event has occurred in the vehicle, in response to the event occurring, transmitting, by the AVN system, information about the event and an event occurrence location to the external server; acquiring, by the external server, the camera video from the AVN system; acquiring, from the management server, a CCTV-recorded video of a nearby CCTV within a set range based on the event occurrence location, synchronizing the camera video and the CCTV-recorded video, and integrating the camera video and the CCTV-recorded video synchronized by the synchronizing into a multi-channel video and storing the multi-channel video.

To solve the preceding technical problems, according to an embodiment of the present disclosure, the event may occur by a request from a user or by an impact.

To solve the preceding technical problems, according to an embodiment of the present disclosure, information synthesized and stored in the external server may be transmitted to a pre-registered mobile phone, the AVN system of the vehicle, or a logged-in personal computer (PC) terminal, by a request from the user.

To solve the preceding technical problems, according to an embodiment of the present disclosure, the synthesizing and storing may include: synchronizing, by the AVN system, the camera video and the CCTV-recorded video, and integrating, by the AVN system, the camera video and the CCTV-recorded video synchronized by the synchronizing into a multi-channel video, and storing the multi-channel video.

To solve the preceding technical problems, according to an embodiment of the present disclosure, the synchronizing may include: based on acquisition time information of metadata included in each of the camera video and the CCTV-recorded video, buffering, by the AVN system, the camera video for a predetermined period of time to match a time interval at which the CCTV-recorded video is received from the external server.

To solve the preceding technical problems, according to an embodiment of the present disclosure, the video recording method may further include by the AVN system, backing up the integrated and stored multi-channel video on the external server or an arbitrary data storage server, by a request from the user or on a predetermined period.

To solve the preceding technical problems, according to an embodiment of the present disclosure, wherein the CCTV information may further include the location, the unique code, the operating state, and the viewing direction of the CCTV, and the synthesizing and storing may include: editing and storing, by the AVN system, the CCTV information by overlapping the CCTV information with the camera video.

To solve the preceding technical problems, according to an embodiment of the present disclosure, the video recording method may further include determining whether an event has occurred in the vehicle, in response to the event occurring, transmitting information about an event occurrence location from the AVN system to the external server; acquiring, by the external server, a CCTV-recorded video of at least one CCTV around the event occurrence location of the vehicle based on the event occurrence location of the vehicle from the management server, transmitting, by the external server, the CCTV-recorded video to the AVN system; synchronizing the camera video and the CCTV-recorded video, and integrating the camera video and the CCTV-recorded video synchronized by the synchronizing into a multi-channel video, and storing the multi-channel video.

To solve the preceding technical problems, according to an embodiment of the present disclosure, the event may occur by a request of the user or by a collision of the vehicle.

To solve the preceding technical problems, according to an embodiment of the present disclosure, there is provided a video recording device of a vehicle equipped with an audio video navigation (AVN) system and at least one camera configured to record, as a camera video, a situation outside the vehicle, wherein the AVN system is configured to transmit, to an external server, a current location of the vehicle, acquire, from the external server, closed-circuit television (CCTV) information of at least one nearby CCTV within a set range from the current location of the vehicle, and synthesize and store the camera video and the CCTV information.

As provided herein, the camera may be a built-in camera of the vehicle, and the vehicle may include the video recording device.

According to embodiments of the present disclosure described herein, a vehicle video recording method and a recording device therefor may store blind spot and surrounding situation information or images that may not be identified by images acquired by a built-in camera mounted in a vehicle, and thus, when there is a need to analyze an accurate cause of an accident and the like, may respond to it rapidly.

DETAILED DESCRIPTION OF THE DISCLOSURE

Figure 1A:
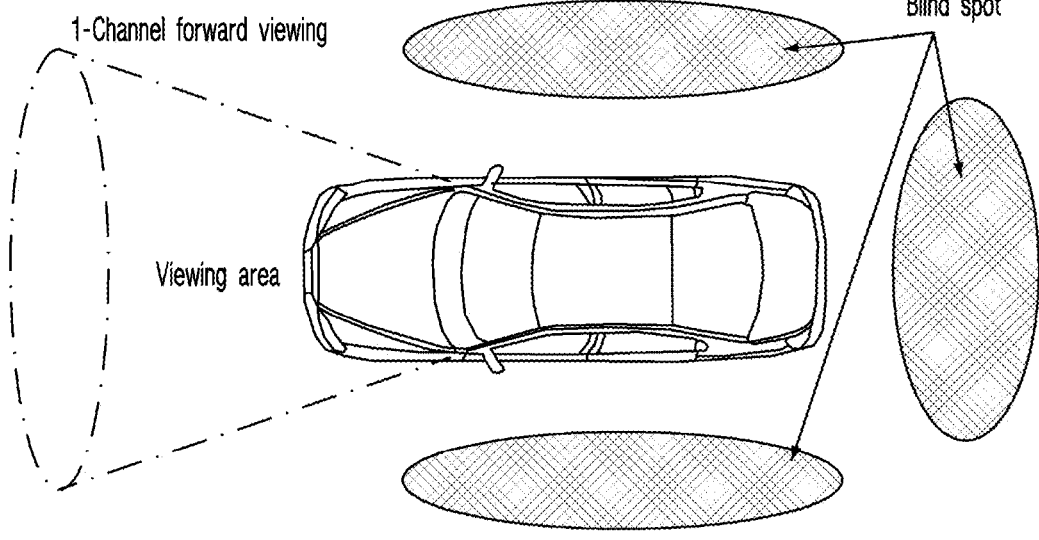
FIGS. 1A to 1C are diagrams illustrating examples of viewing directions and blind spots according to the number of cameras.
Figure 1B:
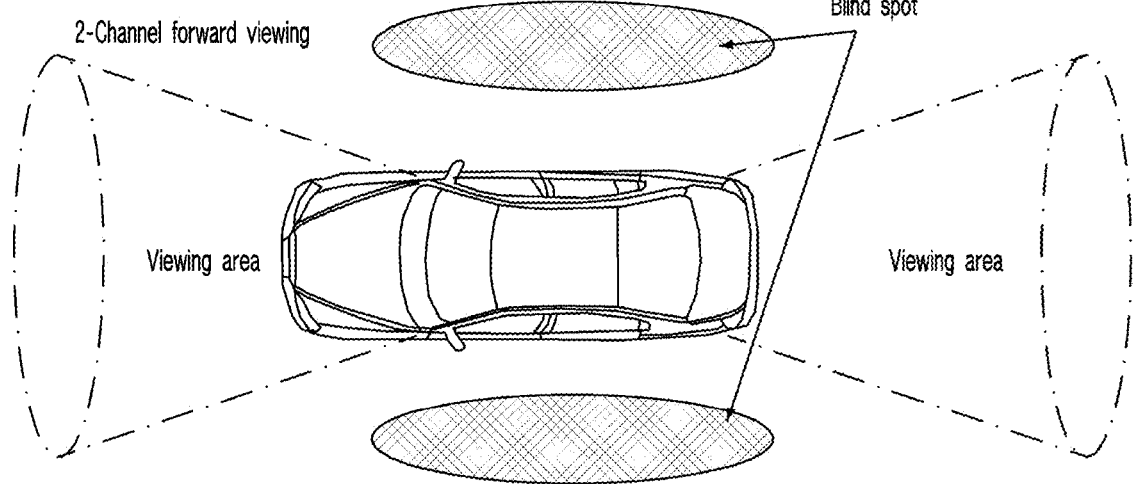
Figure 1C:
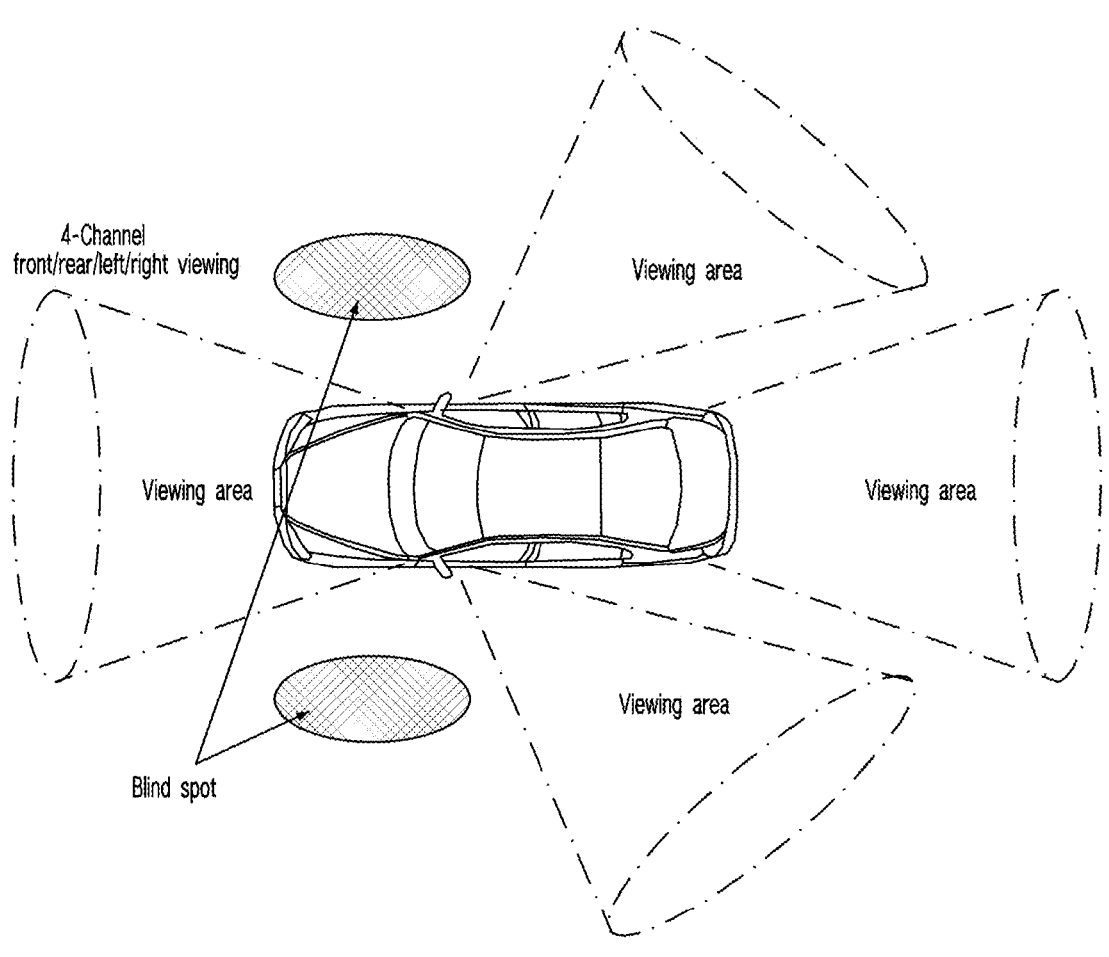

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMS, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to the accompanying drawings. The embodiments are not construed as limited to the disclosure and should be understood to include all changes, equivalents, and replacements within the idea and the technical scope of the disclosure.

Although terms including ordinal numbers, such as "first, " "second," and the like, may be used herein to describe various elements, the elements are not limited by these terms. These terms are only used to distinguish one element from another.

The term "and/or" is used to include any combination of multiple items that are subject to it. For example, "A and/or B" may include all three cases, for example, "A," "B," and "A and B."

When an element is described as "coupled" or "connected" to another element, the element may be directly coupled or connected to the other element. However, it is to be understood that another element may be present therebetween. In contrast, when an element is described as "directly coupled" or "directly connected" to another element, it is to be understood that there are no other elements therebetween.

Unless otherwise defined, all terms including technical and scientific terms used herein have the same meaning as commonly understood by one of ordinary skill in the art to which the present disclosure pertains. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In addition, the term "unit" or "control unit" is merely a widely used term for naming a controller that controls a specific vehicle function, and does not mean a generic functional unit. For example, each controller may include a communication device that communicates with another controller or a sensor to control a function assigned thereto, a memory that stores an operating system (OS), a logic command, input/output information, and the like, and one or more processors that perform determination, calculation, decision, and the like that are necessary for controlling a function assigned thereto.

Meanwhile, a processor may include a semiconductor integrated circuit and/or electronic devices that perform at least one or more of comparison, determination, computation, operations, and decision to achieve programmed functions. The processor may be, for example, any one or a combination of a computer, a microprocessor, a central processing unit (CPU), an application-specific integrated circuit (ASIC), and an electronic circuit (e.g., circuitry and logic circuits).

In addition, computer-readable recording media (or simply memory) include all types of storage devices that store data readable by a computer system. The storage devices may include at least one type of, for example, flash memory, hard disk, micro-type memory, card-type (e.g., secure digital (SD) card or extreme digital (XD) card) memory, random-access memory (RAM), static RAM (SRAM), read-only memory (ROM), programmable ROM (PROM), electrically erasable PROM (EEPROM), magnetic RAM (MRAM), magnetic disk, or optical disc.

This recording medium may be electrically connected to the processor, and the processor may load and record data from the recording medium. The recording medium and the processor may be integrated or may be physically separated.

Hereinafter, a vehicle driving video recording method and device according to embodiments of the present disclosure will be described in detail with reference to the accompanying drawings.

First, the technical concept of the present disclosure will be described as follows. A built-in video recording device of a vehicle has two channels and may thus acquire videos or images of the front and rear sides of the vehicle. However, a problem may arise in that there are blind spots on both sides of the vehicle from which videos or images may not be acquired. This problem may be solved by receiving videos or images of a situation on both sides of the vehicle from the outside. The term "video(s)" may be used interchangeably with "image(s)" herein but may be mostly referred to as video.

The ITS National Transport Information Center of the Ministry of Land, Infrastructure, and Transport (MOLIT) of Korea has a function of transmitting/recording real-time closed-circuit television (CCTV) videos of roads (e.g., high-ways) through a website, and provides traffic information and construction site information for each location of the roads in real time.

Therefore, videos provided by the ITS National Transport Information Center may be used as an external video source to allow users to acquire information about blind spots that may not be acquired from videos of a built-in camera of a vehicle, thereby allowing the users to recognize more objectively a situation associated with an occurrence of an event.

To implement the technical concept of the present disclosure as described above, embodiments of the present disclosure will be described below with reference to the accompanying drawings.

Figure 2:
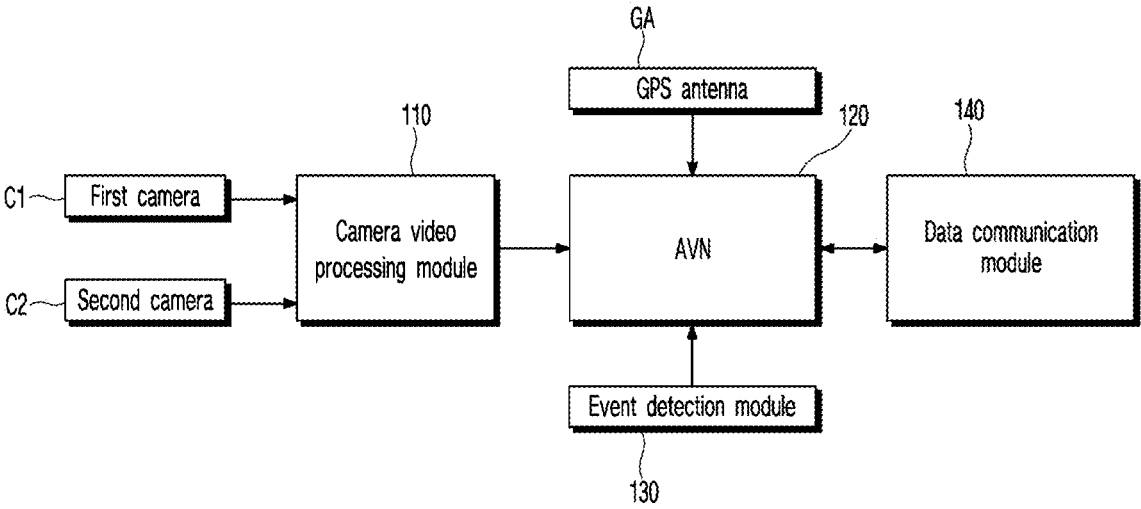
FIG. 2 is a block diagram illustrating a configuration of a video recording device for a vehicle to which a video recording method for a vehicle is applied according to an embodiment of the present disclosure.
Figure 3A:
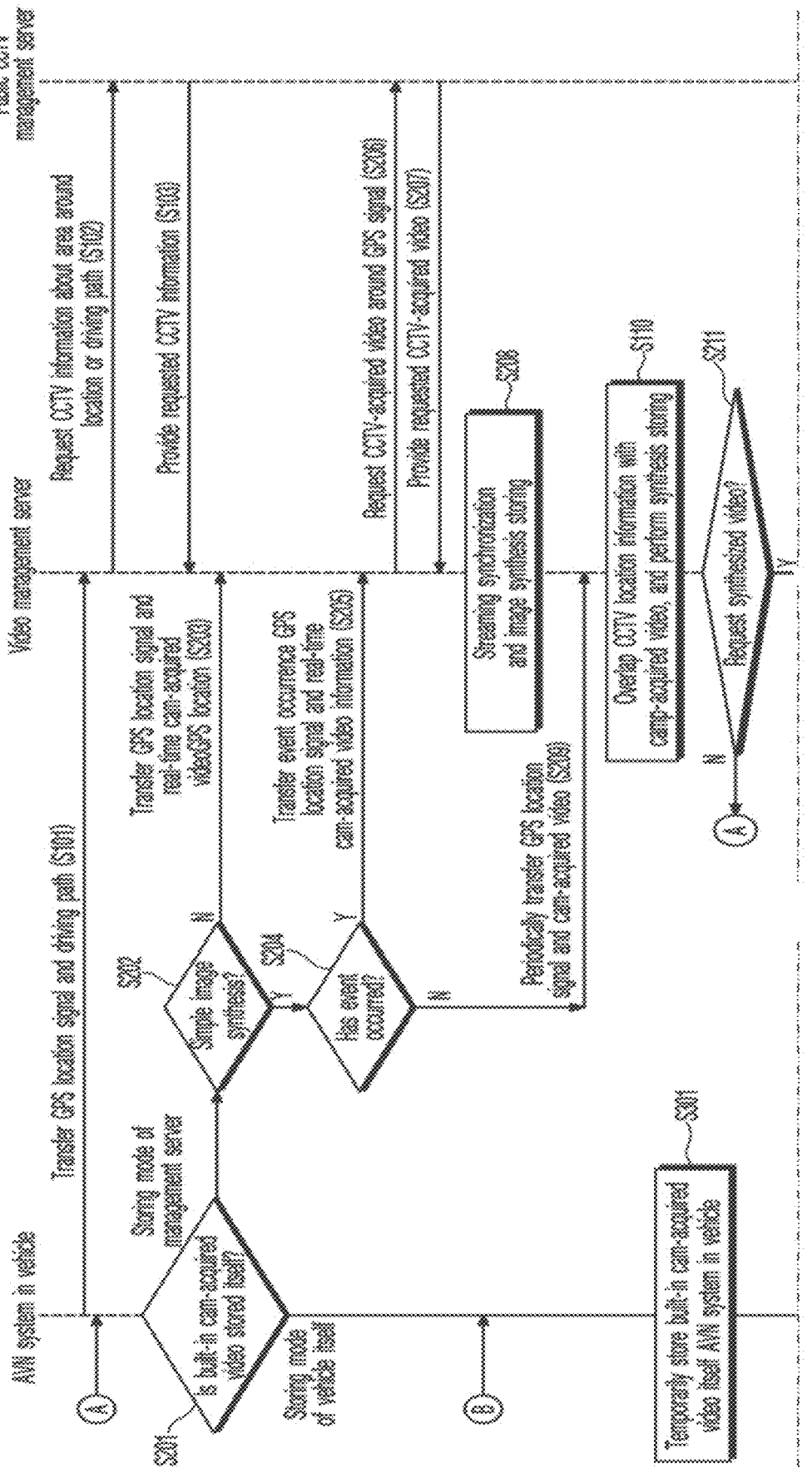
FIG. 3A and FIG. 3B show a flowchart of an example flow of operations of a video recording method for a vehicle according to an embodiment of the present disclosure.
Figure 3B:
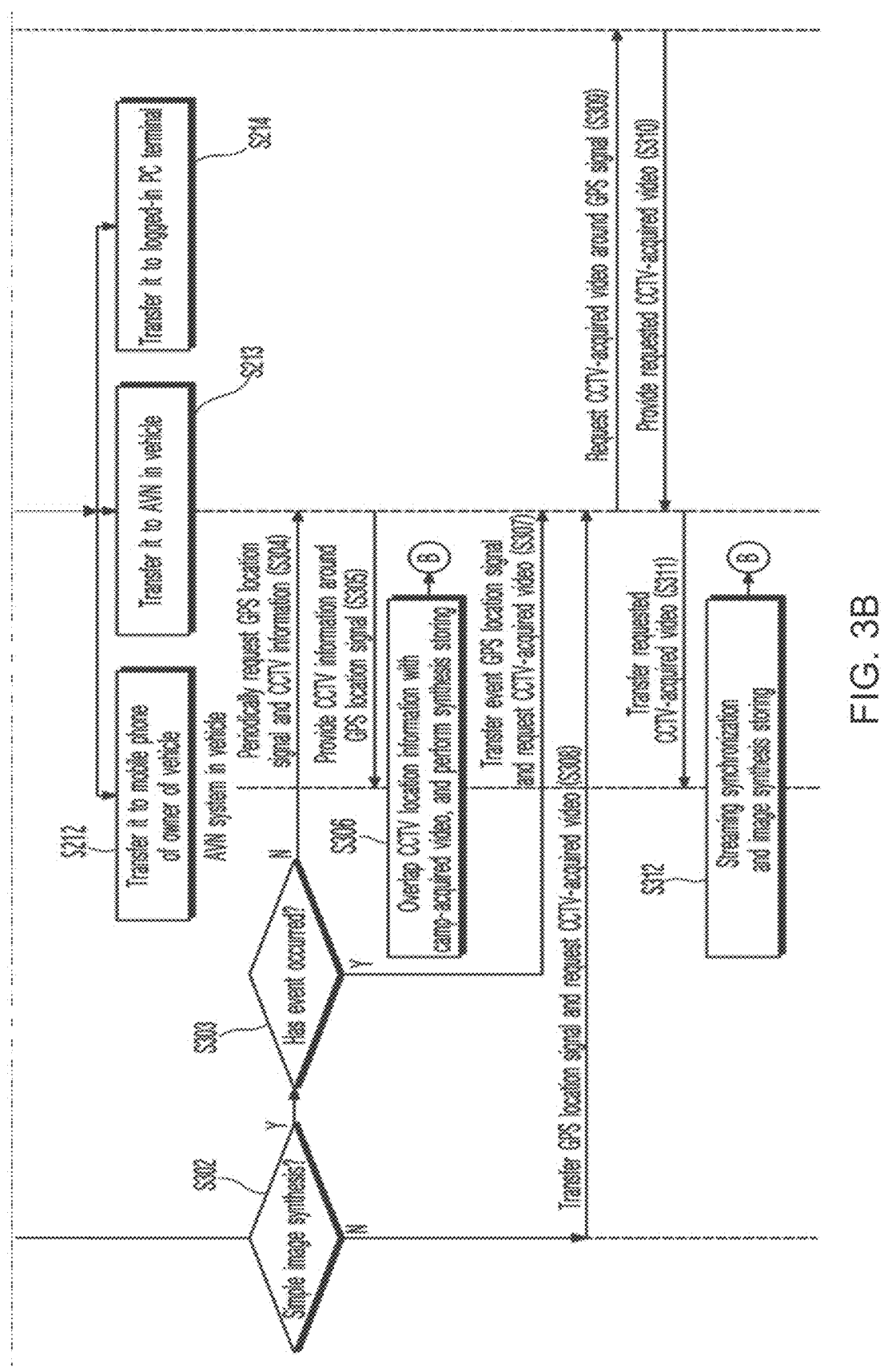

FIG. 2 is a block diagram illustrating a configuration of a video recording device of a vehicle to which a video recording method of the vehicle is applied according to an embodiment of the present disclosure, and FIG. 3A and FIG. 3B show a flowchart illustrating an example flow of operations of a video recording method of a vehicle according to an embodiment of the present disclosure.

Referring to the configuration shown in FIG. 2, the vehicle may include: one or more cameras (e.g., a first camera C1 and a second camera C2) built into the vehicle; a camera video processing module 110 configured to store and manage videos and images acquired from the cameras C1 and C2; an event detection module 130 configured to detect whether an event has occurred; a global positioning system (GPS) antenna (GA) configured to receive GPS signals and recognize a location of the vehicle; a data communication module 140 for data communication with the outside; and an audio video navigation (AVN) system 120 configured to recognize the location of the vehicle through the GA, communicate with the outside through the data communication module 140 based on this, and transmit camera videos acquired through the camera video processing module 110 to the outside and integrate and store the camera videos with information provided from the outside.

The configuration described above may not be sufficient to employ and describe the driving video recording method according to an embodiment of the present disclosure and will thus be further described with reference to FIG. 3A and FIG. 3B.

First, in step S101, the AVN system 120 in the vehicle may transmit, to a video management server, a GPS signal according to the current location of the vehicle that is currently driving, and information about a driving path of the vehicle.

In step S102, the video management server may transmit, to a public CCTV management server, a request for CCTV information of nearby CCTVs corresponding to the current location of the vehicle or the information about the driving path of the vehicle received in step S101.

In step S103, the public CCTV management server may transmit the requested CCTV information to the video management server in response to the request made in step S102.

In this case, an operating process of the driving video recording method according to an embodiment of the present disclosure may vary depending on whether an entity that stores driving videos or images is a vehicle AVN (e.g., the AVN system 120) or the video management server.

Furthermore, the storing may be divided into a regular storing mode and a simple storing mode depending on a type of video to be stored. The regular storing mode may be editing camera (or cam) video and a CCTV video into a multi-channel video and storing the multi-channel video, and the simple storing mode may be overlapping surrounding CCTV information (e.g., a location, a viewing direction, a unique code, and an operating state of a CCTV) with a camera (or cam) video and storing it as base data.

In addition, the storing may be divided into a permanent (or always-on herein) storing mode that stores in real time videos or images for the entire driving path, and a non-permanent storing mode that stores videos or images in response to an occurrence of an event or based on a predetermined period of time.

Therefore, in step S201, whether to store videos acquired by the built-in camera (or built-in cam videos) in the AVN system 120 itself or in the video management server may be determined. In this case, a standard of determination in step S201 may be the user's selection or system settings.

When it is determined in step S201 that a driving video is to be stored in the video management server, step S202 may be performed to determine whether to employ the simple storing mode or the regular storing mode. In this case, a standard of determination in step S202 may also be the user's selection or system settings.

When the regular storing mode is determined in step S202, step S203 may be performed in which the AVN system 120 may transmit image information (indicated as "acquired cam images") in FIG. 3A and FIG. 3B) acquired through the built-in cameras C1 and C2, along with the current GPS signal of the vehicle, to the video management server.

In this case, step S203 may be performed in real time and continuously.

In contrast, when the simple storing mode is determined in step S202, step S204 may be performed to determine whether an event has occurred.

When it is determined in step S204 that an event has occurred, step S205 may be performed. In this step, the AVN system 120 may transmit, in real time, information about the occurrence of the event and an event occurrence location at which the event has occurred, and video information acquired through the built-in cameras C1 and C2, to the video management server.

In this case, step S203 and step S205 may not be performed simultaneously, and the video management server may acquire data transmitted through the data communication module 140 from the AVN system 120 through step S203 or step S205 and proceed to step S206.

In step S206, the video management server may transmit, to the public CCTV management server, a request for a CCTV video acquired from at least one CCTV located nearby based on the GPS signal of the vehicle.

In step S207, the public CCTV management server may provide the requested CCTV video to the video management server.

In step S208, accordingly, the video management server may perform streaming synchronization and image synthesis on the video acquired through the built-in cameras C1 and C2 transmitted by the AVN system 120 in step S203 or step S205 and the CCTV-acquired video provided by the public CCTV management server in step S207, and store a resulting image obtained by performing the streaming synchronization and image synthesis.

In this case, the synchronization may be performed based on video recording time (acquisition time) information of metadata included in each of the videos. In this case, it may include buffering the video acquired through the built-in cameras C1 and C2 for a predetermined time to match it to a time interval at which the CCTV-acquired video is received from the public CCTV management server, and editing it into a multi-channel video.

The editing into the multi-channel video may be performed to compare a CCTV video of at least one CCTV viewing an event occurrence location or a location of the vehicle that is currently driving and a video acquired through the built-in cameras C1 and C2 based on the same point in time. Thus, it may be performed to integrate a video from a viewpoint viewing outside from the inside of the vehicle and a video from a viewpoint viewing inside the vehicle from the outside, and generate driving information of the vehicle without blind spots.

In contrast, in step S209, when it is determined in step S204 that no event has occurred, the AVN system 120 may transmit a GPS signal for the current location of the vehicle that is currently driving to the video management server.

In this case, in step S209, the AVN system 120 may additionally transmit a video acquired through the built-in cameras C1 and C2 at regular intervals. For example, a one minute-long video may be transmitted at an interval of 5 minutes.

An example of transmitting videos acquired through the built-in cameras C1 and C2 at regular intervals is described above with reference to FIG. 3A and FIG. 3B. Such a simple way of generating and recording a driving video may be employed to reduce the burden on the capacity of a memory embedded in an AVN system and reduce data communication traffic for communication with the video management server.

When the video management server acquires the video acquired through the built-in cameras C1 and C2 and the GPS signal in the simple way in step S209, step S210 may then be performed, because the CCTV information (e.g., the CCTV location, viewing direction, unique code, and operating state) has already been acquired in step S102 and step S103, to overlap the surrounding CCTV information (e.g., the CCTV location, viewing direction, unique code, and operating state) with the video image acquired through the built-in cameras C1 and C2 and store it as base data.

Subsequently, in step S211, whether the user has requested a synthesized video may be determined. When it is determined that there is no such request, step S201 may be performed again to perform the process described above repeatedly.

In contrast, when it is determined in step S211 that the user has requested the video synthesized in step S108 or step S210, step S212 may be performed to transmit the synthesized video to a mobile phone of a pre-registered owner of the vehicle, step S213 may be performed to transmit it to the AVN system 120 of the vehicle, or step S214 may be performed to download it onto a logged-in personal computer (PC) terminal, according to the request from the user.

On the other hand, when it is determined in step S201 that the AVN system 120 of the vehicle is an entity of storing the synthesized video, step S301 may be performed to temporarily store the video acquired through the built-in cameras C1 and C2.

In this case, an operation referred to as step S301 in FIG. 3A and FIG. 3B may be performed from when the vehicle is started and may actually be performed before step S201, but is described as above for ease of description and is not limited to what is described above with reference to FIG. 3A and FIG. 3B.

Subsequently, in step S302, whether it is the simple storing mode may be determined, and when the simple storing mode is determined, step S303 may then be performed.

Step S303 may be performed to determine whether an event has occurred. When it is determined that no event has occurred, step S304 may be performed to periodically request the video management server for a GPS signal corresponding to a current location of the vehicle that is currently driving and CCTV information corresponding to the GPS signal.

Since the video management server has already acquired the CCTV information (e.g., the CCTV location, viewing direction, unique code, and operating state) through step S102 and step S103, step S305 may then be performed to provide the related information to the AVN system 120.

The AVN system 120 may overlap the video acquired through the built-in cameras C1 and C2 temporarily stored through step S301 with the CCTV information acquired through step S305, and store a result to perform step S301 again, which may be performed repeatedly until the vehicle arrives at a destination and the start is off.

In contrast, when it is determined in step S303 that an event has occurred, step S307 may be performed to transmit, to the video management server, a GPS signal associated with an event occurrence location and a signal requesting a surrounding CCTV-acquired video corresponding to the GPS signal.

In addition, when it is determined in step S302 that it is not the simple storing mode, step S308 may be performed to transmit, the video management server, the GPS signal of the vehicle that is currently driving and the signal requesting the surrounding CCTV-acquired video corresponding to the GPS signal.

In this case, step S307 and the step S308 may not be performed simultaneously, and when the video management server receives the request in step S307 or step S308, step S309 may be performed to request the public CCTV management server for a CCTV-acquired video corresponding to the request made in step S307 or step S308.

In step S310, in response to the request made in step S309, the public CCTV management server may provide, to the video management server, a video acquired from the at least one CCTV located nearby based on the GPS signal.

In step S311, the video management server may transmit the requested CCTV-acquired video to the AVN system 120. In step S312, the AVN system 120 may perform streaming synchronization on the video acquired through the built-in cameras C1 and C2 temporarily stored in step S301 and the CCTV-acquired video received in step S311, and synthesize a result into a multi-channel video and store the multi-channel video.

Accordingly, in a case where it is difficult to determine a situation of an accident only using a video recorded by a built-in camera, after a location at which the vehicle is driving is identified, the video may be used along with road CCTV information and road information (about an accident, a construction, etc.) provided by the government (the Ministry of Land, Infrastructure, and Transport of Korea) to acquire a situation around the vehicle.

It is therefore possible to secure and store blind spots and surrounding situation information or videos that may not be identified from the video acquired from the built-in camera mounted on the vehicle, enabling a rapid response when an analysis of an accurate cause of an accident and the like is needed.

While desirable embodiments of the present disclosure have been shown and described above, it will be apparent to one of ordinary skill in the art that various modifications or changes in form and details may be made in these embodiments without departing from the spirit and scope of the claims and their equivalents.

What is claimed is:

1. A video recording method of a vehicle equipped with an audio video navigation (AVN) system, the video recording method comprising:

recording, by at least one camera, a video of an outside of the vehicle;

transmitting a current location of the vehicle to an external server;

acquiring, by the external server, closed-circuit television (CCTV) information of at least one CCTV around the current location of the vehicle through a management server configured to manage public CCTVs; and synthesizing and storing, by the AVN system or the external server, a camera video recorded through the camera and the CCTV information, wherein the CCTV information comprises a CCTV-recorded video of a viewpoint from which the vehicle is viewed from the outside, and wherein synthesizing and storing the camera video comprises:

acquiring, by the external server, the camera video from the AVN system; and editing and storing the CCTV information by overlapping the CCTV information with the camera video.

2. The video recording method of claim 1, wherein the CCTV information further comprises a location, a unique code, an operating state, and a viewing direction of the CCTV.

3. The video recording method of claim 1, wherein transmitting the current location of the vehicle comprises:

transmitting, by the AVN system, global positioning system (GPS) information that is based on the current location of the vehicle, and a driving path of the vehicle.

4. The video recording method of claim 1, wherein acquiring the CCTV information comprises:

acquiring the CCTV information from the at least one CCTV viewing the vehicle based on the current location and the driving path of the vehicle.

5. The video recording method of claim 1, wherein synthesizing and storing the camera video comprises:

synchronizing the camera video and the CCTV-recorded video; and integrating the camera video and the CCTV-recorded video synchronized by the synchronizing into a multi-channel video and storing the multi-channel video.

6. The video recording method of claim 5, wherein synthesizing and storing the camera video further comprises:

based on acquisition time information of metadata comprised in each of the camera video and the CCTV-recorded video, buffering, by the external server, the camera video for a predetermined period of time to match a time interval at which the CCTV-recorded video is received from the management server.

7. The video recording method of claim 1, further comprising:

determining whether an event has occurred in the vehicle;

in response to determining that the event has occurred, transmitting, by the AVN system, information about the event and an event occurrence location to the external server;

acquiring, by the external server, the camera video from the AVN system;

acquiring, from the management server, a CCTV-recorded video of a nearby CCTV within a set range based on the event occurrence location;

synchronizing the camera video and the CCTV-recorded video; and integrating the camera video and the CCTV-recorded video synchronized by the synchronizing into a multi-channel video and storing the multi-channel video.

8. The video recording method of claim 7, wherein the event corresponds to a request from a user.

9. The video recording method of claim 7, wherein the event corresponds to an impact of the vehicle.

10. The video recording method of claim 1, wherein information synthesized and stored in the external server is transmitted to a pre-registered mobile phone, the AVN system of the vehicle, or a logged-in personal computer (PC) terminal, by a request from a user.

11. The video recording method of claim 1, wherein synthesizing and storing the camera video comprises:

synchronizing, by the AVN system, the camera video and the CCTV-recorded video; and integrating, by the AVN system, the camera video and the CCTV-recorded video synchronized by the synchronizing into a multi-channel video, and storing the multi-channel video.

12. The video recording method of claim 11, wherein synchronizing and storing the camera video further comprises:

based on acquisition time information of metadata comprised in each of the camera video and the CCTV-recorded video, buffering, by the AVN system, the camera video for a predetermined period of time to match a time interval at which the CCTV-recorded video is received from the external server.

13. The video recording method of claim 11, further comprising:

by the AVN system, backing up the integrated and stored multi-channel video on the external server or an arbitrary data storage server, by a request from a user or on a predetermined period.

14. The video recording method of claim 13, further comprising:

determining whether an event has occurred in the vehicle;

in response to the event occurring, transmitting information about an event occurrence location from the AVN system to the external server;

acquiring, by the external server, a CCTV-recorded video of at least one CCTV around the event occurrence location of the vehicle based on the event occurrence location of the vehicle from the management server;

transmitting, by the external server, the CCTV-recorded video to the AVN system;

synchronizing the camera video and the CCTV-recorded video; and integrating the camera video and the CCTV-recorded video synchronized by the synchronizing into a multi-channel video, and storing the multi-channel video.

15. The video recording method of claim 1, wherein the CCTV information further comprises a location, a unique code, an operating state, and a viewing direction of the CCTV, wherein synthesizing and storing the camera video comprises:

editing and storing, by the AVN system, the CCTV information by overlapping the CCTV information with the camera video.

16. The video recording method of claim 15, wherein the event corresponds to a request of a user or by a collision of the vehicle.

17. A video recording device of a vehicle, comprising:

an audio video navigation (AVN) system and at least one camera, wherein the AVN system is configured to:

record, by the at least one camera, a video of an outside of the vehicle;

transmit, to an external server, a current location of the vehicle;

acquire, from the external server, closed-circuit television 5 (CCTV) information of at least one nearby CCTV within a set range from the current location of the vehicle; and synthesize and store the camera video and the CCTV information, 10 wherein to synthesize and store the camera video, the AVN system is further configured to:

acquire, from the external server, the camera video recorded by the at least one camera; and edit and store the CCTV information by overlapping the 15 CCTV information with the camera video.

18. The video recording device of claim 17, wherein the at least one camera is a built-in camera arranged on the vehicle.

19. A vehicle comprising the vehicle recording device of 20 claim 17.

* * * * *